(12) United States Patent
Berube et al.

(10) Patent No.: US 11,748,511 B2
(45) Date of Patent: Sep. 5, 2023

(54) PROTECTING DATA BASED ON CONTEXT OF DATA MOVEMENT OPERATION

(71) Applicant: EMC IP Holding Company LLC, Hopkinton, MA (US)

(72) Inventors: Paul Normand James Berube, Edmonton (CA); Victor Salamon, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 17/218,940

(22) Filed: Mar. 31, 2021

(65) Prior Publication Data
US 2022/0318421 A1 Oct. 6, 2022

(51) Int. Cl.
*G06F 21/62* (2013.01)
*G06F 21/54* (2013.01)
*G06F 21/44* (2013.01)
*G06F 21/78* (2013.01)
*G06F 21/53* (2013.01)

(52) U.S. Cl.
CPC .......... *G06F 21/6245* (2013.01); *G06F 21/44* (2013.01); *G06F 21/54* (2013.01); *G06F 21/6218* (2013.01); *G06F 21/78* (2013.01); *G06F 21/53* (2013.01)

(58) Field of Classification Search
CPC .......... G06F 21/44; G06F 21/52; G06F 21/54; G06F 21/62; G06F 21/6218; G06F 21/6245; G06F 21/78; G06F 21/53
See application file for complete search history.

(56) References Cited

U.S. PATENT DOCUMENTS

| | | | |
|---|---|---|---|
| 8,844,042 B2* | 9/2014 | Treit | G06F 21/577 726/25 |
| 2019/0268379 A1* | 8/2019 | Narayanaswamy | H04L 63/0245 |
| 2020/0057864 A1* | 2/2020 | Parthasarathy | G06F 16/24578 |
| 2020/0159953 A1* | 5/2020 | Straw | G06F 21/6245 |

OTHER PUBLICATIONS

Lord, Nate, Data Protection: Data in transit vs. Data at Rest, available at https://digitalguardian.com/blog/data-protection-data-in-transit-vs-data-at-rest#:~:text=Data%20protection%20at%20rest%20aims,target%20than%20data%20in%20motion (accessed Mar. 31, 2021), Jul. 15, 2019.

* cited by examiner

*Primary Examiner* — D'Arcy Winston Straub
(74) *Attorney, Agent, or Firm* — Ryan, Mason & Lewis, LLP

(57) ABSTRACT

Methods, apparatus, and processor-readable storage media for protecting data based on a context of data movement operations are provided herein. An example computer-implemented method includes identifying a context of a data movement operation based at least in part on a source and an indicated destination of data associated with the data movement operation; applying one or more data protection policies to the data movement operation based at least in part on the identified context, wherein a given data protection policy comprises one or more indications of one or more content scanners that are configured to detect data belonging to one or more regulated data classes; and in response to detecting data associated with the data movement operation that belongs to at least one of the regulated data classes, performing one or more automated remedial actions associated with the at least one regulated data class.

20 Claims, 6 Drawing Sheets

PROTECTING DATA BASED ON CONTEXT OF DATA MOVEMENT OPERATION

FIELD

The field relates generally to information processing systems, and more particularly to data protection in such systems.

BACKGROUND

Cloud-based data hosting is becoming increasingly common. The data of an organization frequently includes sensitive information that is subject to one or more protection policies. The protection policies can be based on the internal requirements of the organization and/or external regulatory requirements, for example. Such protection policies impose restrictions on how and where data can be stored and accessed.

SUMMARY

Illustrative embodiments of the disclosure provide techniques for protecting data based on a context of a data movement operation. An exemplary computer-implemented method includes identifying a context of a data movement operation based at least in part on a source and an indicated destination of data associated with the data movement operation; applying one or more data protection policies to the data movement operation based at least in part on the identified context, wherein a given data protection policy comprises one or more indications of one or more content scanners that are configured to detect data belonging to one or more regulated data classes; and in response to detecting data associated with the data movement operation that belongs to at least one of the regulated data classes, performing one or more automated remedial actions associated with the at least one regulated data class.

Illustrative embodiments can provide significant advantages relative to conventional data protection techniques. For example, challenges associated with protecting data are overcome in one or more embodiments by automatically detecting violations of data protection policies for data movement operations and performing one or more remedial actions to protect the data associated with the operations.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
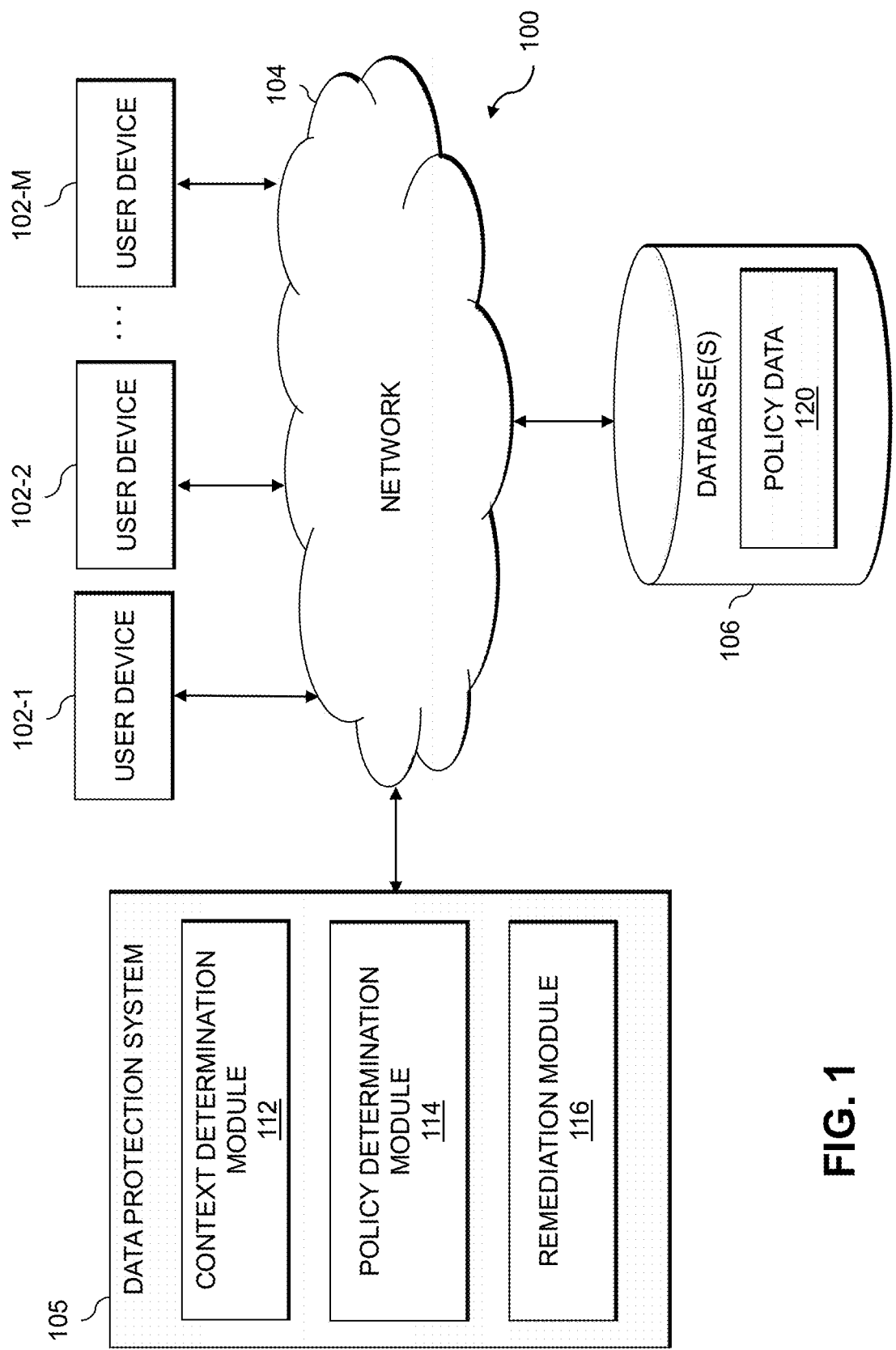
FIG. 1 shows an information processing system configured for protecting data based on a context of a data movement operation in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a data protection system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the data protection system 105 can have at least one associated database 106 configured to store policy data 120 pertaining to, for example, data policies and/or content scanners.

An example database 106, such as depicted in the present embodiment, can be implemented using one or more storage systems associated with the data protection system 105.

Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the data protection system 105 are one or more input-output devices, which illustratively comprise keyboards, displays or other types of input-output devices in any combination. Such input-output devices can be used, for example, to support one or more user interfaces to the data protection system 105, as well as to support communication between data protection system 105 and other related systems and devices not explicitly shown.

Additionally, the data protection system 105 in the FIG. 1 embodiment is assumed to be implemented using at least one processing device. Each such processing device generally comprises at least one processor and an associated memory, and implements one or more functional modules for controlling certain features of the data protection system 105.

More particularly, the data protection system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the data protection system 105 to communicate over the network 104 with the user devices 102, and illustratively comprises one or more conventional transceivers.

The data protection system 105 further comprises a context determination module 112, a policy determination module 114, and a remediation module 116.

It is to be appreciated that this particular arrangement of modules 112, 114 and 116 illustrated in the data protection system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for data protection system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the data protection system 105 and database(s) 106 can be on and/or part of the same processing platform.

An exemplary process utilizing modules 112, 114 and 116 of an example data protection system 105 in computer network 100 will be described in more detail with reference to, for example, the flow diagram of FIG. 4.

Figure 2:
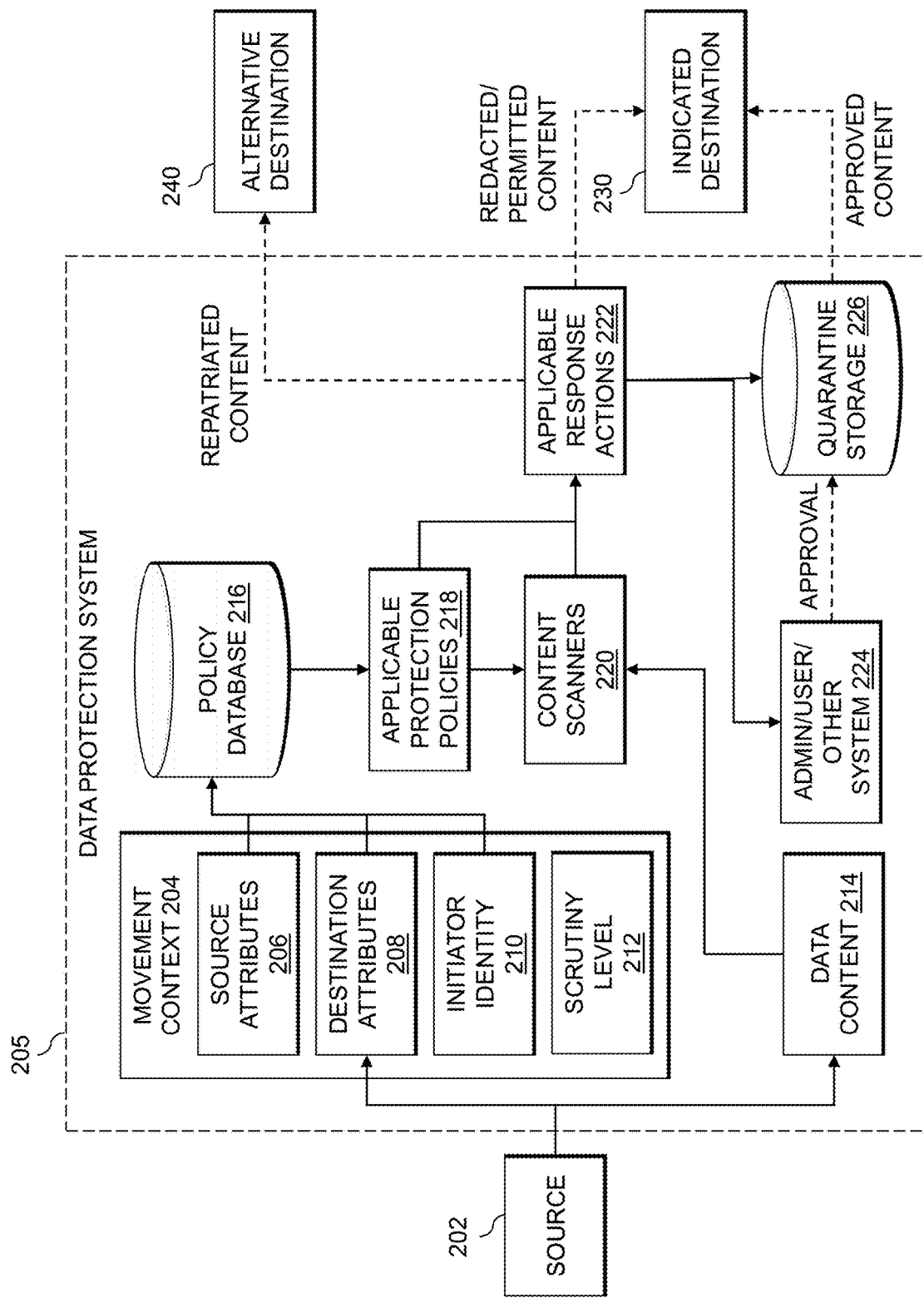
FIG. 2 shows a data movement process between components of a data protection system in an illustrative embodiment.

Referring now to FIG. 2, this figure shows a data movement process between components of a data protection system 205 in an illustrative embodiment. In the FIG. 2 embodiment, the data protection system 205 may be implemented between a source 202 of data associated with a data movement operation and an indicated destination 230 of the data associated with the data movement operation. For example, the indicated destination 230 may be a destination specified in the data movement operation and/or originally determined for the data movement operation. In some examples, the data protection system 205 may be implemented in a datacenter (for example, as a virtual or physical appliance) associated with an organization, or in a target cloud environment, for example. An example embodiment includes the data protection system 205 determining a movement context 204 of the data movement operation, wherein the movement context 204 comprises at least one of: one or more source attributes 206, one or more destination attributes 208, an initiator identity 210, and a computed scrutiny level 212.

In at least one embodiment, the source 202 and the indicated destination 230 may be physically and/or virtually distinct based on one or more of the source attributes 206 and the destination attributes 208. As such, each of the source attributes 206 and the destination attributes 208 may include at least one of: characteristics of the devices and/or cloud environments associated with the source 202 and the indicated destination 230, such as, for example, system names, geographic locations, and/or vendors, domains, filesystem paths, file ownership, and access permissions.

The initiator identity 210 corresponds to an initiator of the data movement operation. The term "initiator" as used herein is intended to be broadly construed, so as to encompass, one or more processes that trigger the data movement operation or a user associated with the one or more processes, for example. Accordingly, the initiator identity 210 may include at least one of: characteristics of the user and characteristics associated with the one or more processes.

In some example embodiments, the scrutiny level 212 is a variable that is used to control the applicable response actions 222. The data protection system 205 may map the characteristics of the initiator identity 210 to a set of scrutiny levels 212 maintained by the data protection system 205. The scrutiny level 212 may be modified by such applicable response actions 222 or by administrative controls, for example. In some examples, the scrutiny level 212 may be defined in terms of the number of violations (or "strikes"). For example, a scrutiny level that is set to 2, may trigger an alert to be sent after a user performs two improper data movement operations, whereas a scrutiny level set to 3 may apply one or more additional checks and/or additional response actions on future data movements of the user (e.g., scanning for additional patterns and/or blocking all data movement operations).

Additionally, in some example embodiments, an initiator identity 210 may have multiple identity characteristics, and the scrutiny level 212 may be computed from these identity characteristics. For example, the scrutiny level 212 may be computed based on whether the initiator is a member of one or more groups, wherein each group has a corresponding scrutiny level. As a non-limiting example, if an initiator belongs to two groups, then the initiator identity 210 may include the following characteristics: two group user identifiers and one user identifier. In this example, the scrutiny level 212 may be computed based on the scrutiny levels corresponding to each group plus the individual scrutiny level of the user. Such scrutiny levels may be combined using different methods, such as, for example, using simple addition.

The data protection system 205 also includes a policy database 216 comprising a plurality of protection policies, as described in more detail below in conjunction with FIG. 3, for example. Generally, the data protection system 205 selects one or more applicable protection policies 218 from the policy database 216 based on the movement context 204. The protection policies in the policy database 216 may be defined according to, for example, internal policies of an organization or external requirements (such as, for example, regulatory requirements), which, in some examples, can be entered using tools and/or templates provided by the data protection system. By way of example, the tools and/or templates may include at least on of: a graphical user interface (GUI) may be configured to facilitate generating context matching criteria and selecting scanners and response actions from available options; a GUI that produces commonly used policy structures using a simplified format that hides many options, possibly by filling in a few fields in a mostly complete generic template; an expert system that can build one or more policies by generating questions and obtaining user input in response to such questions; one or more artificial intelligence techniques that can take classified training data to construct a generalized policy from examples; and examples and templates written in a structured language (e.g., j son, yaml, or xml) that a user may edit or copy/paste to build a personalized set of policies.

The applicable protection policies 218 identify content scanners 220 that detect at least portions of data content 214 associated with the data movement operation that match to one or more violation classes defined by the applicable protection policies 218. The data protection system 205 executes each of the content scanners 220, identified by the applicable protection policies 218, on the data content 214. In response to detecting a match, the data protection system 205 triggers a set of applicable response actions 222 defined by the applicable protection policies 218 for each of the violation classes.

In at least some embodiments, the content scanners 220 may be identified or selected based at least in part on the scrutiny level 212 (e.g., a computationally expensive scanner is only used when the scrutiny satisfies some threshold value). Additionally, the scrutiny level 212 may be configured to enable or disable at least one of the violation classes (e.g., a particular scan violation triggers one or more response actions only when the scrutiny level 212 satisfies a threshold value) and/or to enable or disable applicable response actions 222 (e.g., a particular response action is triggered only when the scrutiny level 212 satisfies a threshold value).

As a non-limiting example, a given violation class may correspond to data that includes personally identifiable information, credit card numbers, or data that is classified as internal confidential. In at least some example embodiments, the content scanners 220 may produce metadata about each violation (for example, the location of a violation). The corresponding set of response actions for a given violation class may be triggered when a violation is detected. In some examples, the metadata generated by the scanners may be used to perform the corresponding response action.

The applicable response actions 222 may include, for example, one or more of the following:

Quarantine Action: the data operation is intercepted by the data protection system 205 and is held for manual approval. For example, the data content 214 may be held in the quarantine storage 226. Optionally, an alert action (as described in further details below, for example) is used to send an alert, for example, to an at least one of administrator, user, and/or other system 224 for approval of at least some of the data content 214. If approved, then the data protection system may resume the data movement operation and move any of the data content 214 that has been approved from the quarantine storage 226 to the indicated destination 230. In some example embodiments, the quarantine storage 226 may be configured to be in a local storage system that accessible by the data protection system.

Redact Action: The data protection system 205 may use metadata provided by the content scanners 220 to modify the data content 214. For example, the data content 214 may be modified so that it no longer violates one or more of the applicable protection policies, while leaving the remainder of the data content 214 unchanged. In one example embodiment, only the redacted data content is sent to the indicated destination 230. The redaction action may include performing at least one of: replacing data content with a pre-defined placeholder, a pseudonymization technique, and anonymization technique.

Repatriate Action: The data protection system 205 redirects the data movement operation to an appropriate alternative destination 240 that does not violate the applicable protection policies 218. In at least one example embodiment, only the parts of the data content 214 that violate the applicable protection policies 218 are sent to the alternative destination 240, while other non-violating parts of the data content 214 are sent to the indicated destination 230. In one example embodiment, an in-place scan can be performed, where the repatriate action removes the data from the source location and transfers it to the alternative destination 240 to automatically enforce compliance with new or additional policies and/or regulations. For example, if a data movement operation involves moving data content to a server in a country that is prohibited by a protection policy, then the alternative destination may be a server located in a country not prohibited by the protection policy.

Isolate Action: The data protection system 205 temporarily or permanently blocks all current and future data movement from the source 202 and/or data movement performed by initiators matching the characteristics of the initiator identity for a given data movement operation, according to a policy-defined pattern of violations, for example.

Segregate Action: The data protection system 205 temporarily or permanently blocks all current and future data movement operations to the indicated destination 230, according to a policy-defined pattern of violations. In some examples, the segregate action prevents any data content 214 from proceeding to the indicated destination 230. Additionally, or alternatively, the segregate action may work in combination with, for example, a repatriate action to send data to the alternative destination 240.

Change Scrutiny Action: The data protection system 205 modifies the scrutiny level 212 that is associated with one or more of the characteristics of the initiator identity 210 (e.g., user identifier, group membership, etc.). It is noted that the scrutiny level 212 is part of the movement context and thus can be used to control other response actions, such as, for example, block, isolate, and/or segregate action for future data movement operations.

Block Action: The data protection system 205 rejects the data movement operation, and the original data content 214 is retained at the source 202.

Protect Action: The data protection system 105 transmits the data content 214 to the indicated destination 230, but modifies one or more access control attributes, for example, provided by the destination filesystem (e.g.: ownership, read/write permissions, access control lists) at the indicated destination 230, as defined by the protection policy.

Alert Action: The data protection system 205 notifies the data owner, initiator, and/or administrator of particular violations and/or any response actions that have been taken. In one embodiment, in the absence of any other action that controls the data movement operation, the data content 214 is transmitted to the indicated destination 230. The alert action can be used in combination with any other actions, or on its own for auditing or oversight purposes.

Encryption: The data protection system 105 applies encryption to the data content 214 before transmitting it to the indicated destination 230.

Figure 3:
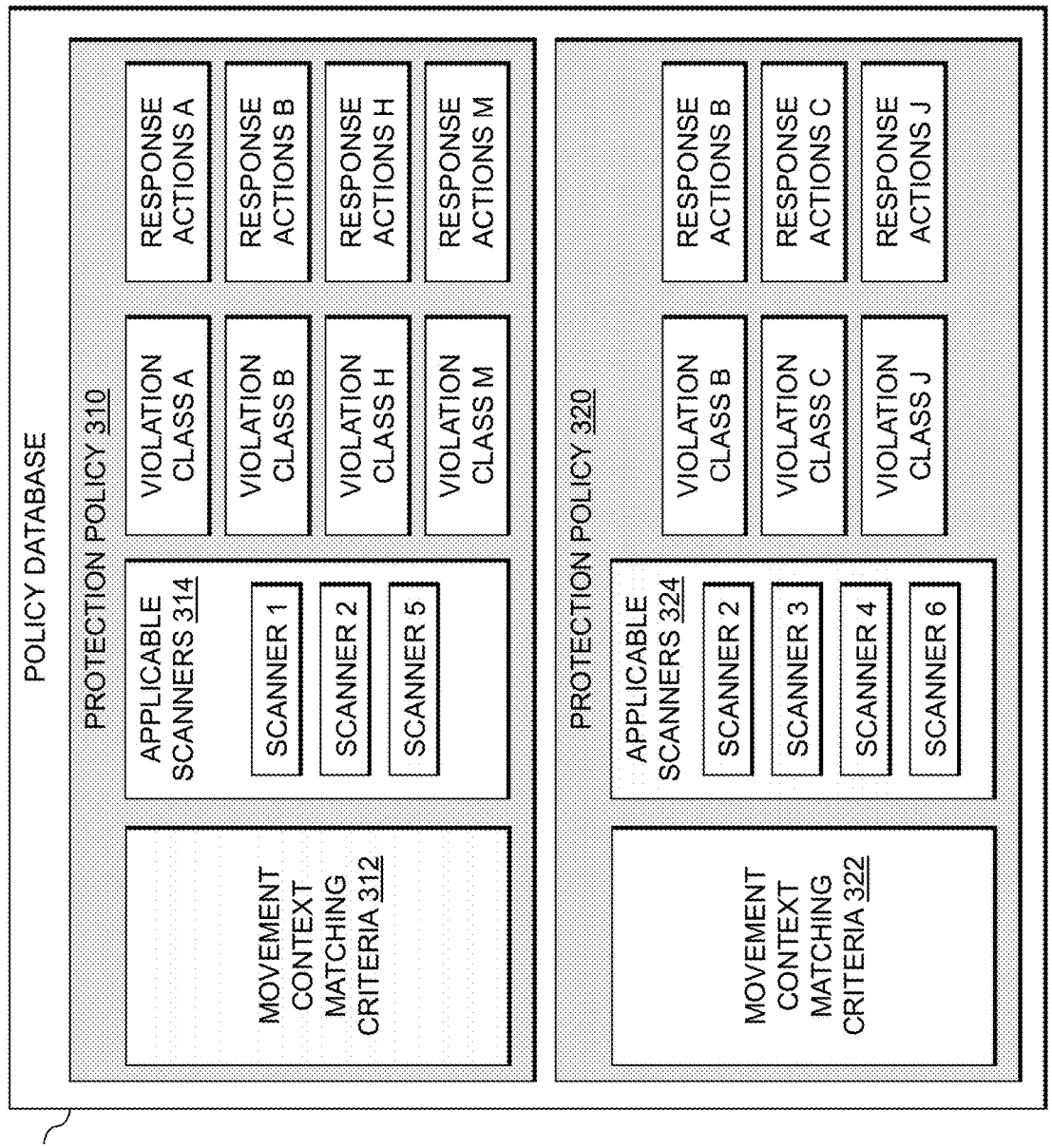
FIG. 3 shows a protection policy database in an illustrative embodiment.

FIG. 3 shows a protection policy database 216 in an illustrative embodiment. In this example, the policy database 216 includes two protection policies 310, 320, although it is to be appreciated that in other examples the policy database may include more than two protection policies. Each of the protection policies 310, 320 includes a respective movement context matching criterion 312, 322. Generally, the movement context matching criteria 312, 322 map movement contexts onto a set of applicable scanners 314, 324. In one example embodiment, the movement context may be matched based on pattern matching (e.g., glob) on any of its attributes.

In the FIG. 3 example, the two protection policies 310, 320 identify six different content scanners (scanners 1-6), six different violation classes (violations A, B, C, H, J, and M), and six corresponding sets of response actions (response actions A, B, C, H, J, and M). It is noted that in the FIG. 3 example, content scanner 2 is used in both of the protections policies 310, 320. Also, in the FIG. 3 example, the protection policy 310 includes three scanners that produce four violation classes, whereas protection policy 320 includes four scanners that produce three violation classes. By way of example, if a protection policy specifies that a file moving from a local directory to another local directory requires no scan, then the list of applicable scanners may be empty; whereas another protection policy specifying that a file moving from one domain to another domain may require one or more scanners.

A data movement operation, in some example embodiments, may involve data content corresponding to one or more of text-style documents (e.g., plain text, html, email, and instant messages); rich-format documents (e.g., pdf, word processor, spreadsheet, and presentation slides); compressed files and archives; image-based documents (e.g., pdf, photos, scans, screenshots, videos); and the contents of virtual filesystems (e.g., virtual-machine disk images/snapshots and docker containers), for example. The content scanners may be configured to identify regulated data in such data content using one or more of the following techniques: customizable regular expressions, key/value lookups, natural language processing, special-purpose code (e.g., plugins), and/or machine learning. The term regulated data refers to the data content associated with one or more of violation classes as specified by the protection policies.

In one or more example embodiments, the data protection system 105 is configured to perform in-place scans where the source and destination are the same, and take protection actions (such as, for example, protect, redact, repatriate, quarantine, or alert to correct a violation). When employed in a cloud environment, the repatriate action can automatically remove violating data from the cloud and return it to, for example, the storage of the relevant organization. Such in-place scans may be performed to test one or more proposed changes to the protection policies. As such, the data protection system may generate a report of the violations and actions without actually changing the underlying data content, thereby helping administrators plan for and predict the cost of data migrations and other impacts of implementing such policy changes.

Also, in some example embodiments, the data protection system 105 may be provided through one or more of the following mechanisms: software licensed for on-site use; a network appliance installed at the boundaries of the on-site network, and a cloud service for in-place scanning or in-flight scanning on entry to and/or exit from the cloud. Depending on the implementation, the data protection system allows different types of charge models, including, for example: pay-per-use (e.g., per file, per file type, per data amount, per transfer, per number of sites, per number of unique users/initiator identities, or per scan); a time-based subscription; capacity-based, according to storage capacity of each storage location; by capability, using individually licensed plugins to provide capabilities for specific content types, or pre-build bundles of content scanners and protection policies to enforce specific government regulation. As such, it is to be appreciated that there the data protection enables different charge model combinations, such as, for example, a per-file per-protection-action pay-per-use license.

Figure 4:
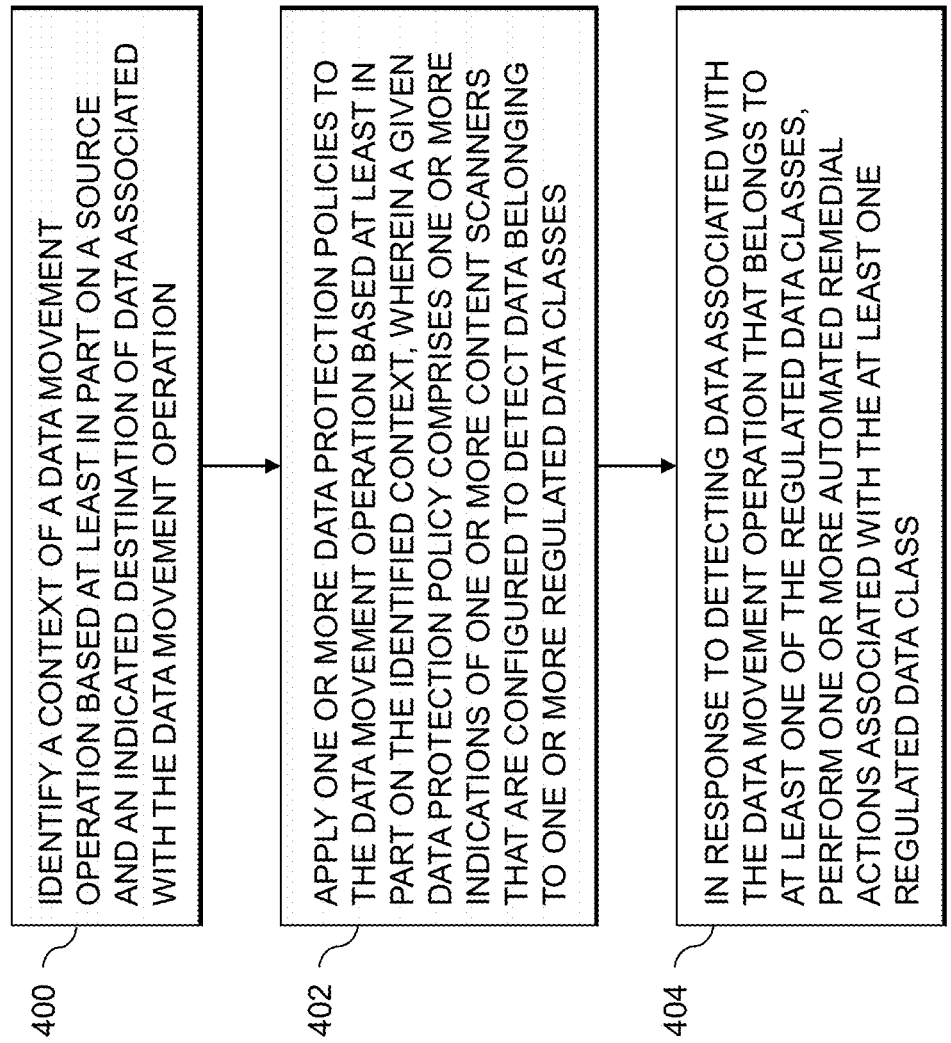
FIG. 4 shows a flow diagram of a process for preventing data protection policy violations in an illustrative embodiment.

FIG. 4 is a flow diagram of a process for protecting data based on a context of data movement operations in an illustrative embodiment. It is to be understood that this particular process is only an example, and additional or alternative processes can be carried out in other embodiments.

In this embodiment, the process includes steps 400 through 404. These steps are assumed to be performed by the data protection system 105 utilizing its modules 112, 114 and 116. Step 400 includes identifying a context of a data movement operation based at least in part on a source and an indicated destination of data associated with the data movement operation. Step 402 includes applying one or more data protection policies to the data movement operation based at least in part on the identified context, wherein a given data protection policy comprises one or more indications of one or more content scanners that are configured to detect data belonging to one or more regulated data classes. Step 404 includes, in response to detecting data associated with the data movement operation that belongs to at least one of the regulated data classes, performing one or more automated remedial actions associated with the at least one regulated data class.

The identifying of step 400 may include determining one or more of the following attributes for at least one of the source and the indicated destination: a physical location; a virtual location; a system name; and a vendor. Identifying the context may be further based on one or more characteristics of a process triggering the data movement operation. The one or more characteristics may include at least one of a user identifier and one or more group identifiers. Identifying the context further comprises computing a scrutiny level for said process based on the one or more characteristics. The one or more content scanners may be further configured to generate metadata in response to detecting that the data associated with the data movement operation belongs to at least one of the regulated data classes, and the one or more automated remedial actions are performed based at least in part on the metadata. The metadata may include a location of the detected data. The one or more automated remedial actions may include one or more of: redirecting at least a portion of the detected data to a different destination; redacting at least a portion of the detected data; preventing the data movement operation; blocking one or more additional data movement operations from the source and/or to the indicated destination; and generating one or more alerts. The context of the data movement operation may include a set of attributes corresponding to at least the source, the indicated destination, and a process triggering the data movement operation. The one or more automated remedial actions may include one or more of: providing feedback information to change a context of one or more subsequent data movement operations having at least one shared attribute with the set of attributes corresponding to the data movement operation.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve data protection and regulatory compliance. These and other embodiments can effectively overcome problems associated with existing testing techniques that require one or more of: centralized data repositories to control access; automation support frameworks that rely on external tools for the detection of regulated data and external tools to implement non-trivial protection actions; and scanning or auditing tools that target specific regulations. For example, some embodiments are configured to provide at least one of: in-flight scanning of data content without needing central data repositories, automated response policies and an integrated solution that provides built-in support for detection and protection actions. These and other embodiments can effectively improve how data is protected during data movement operations relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
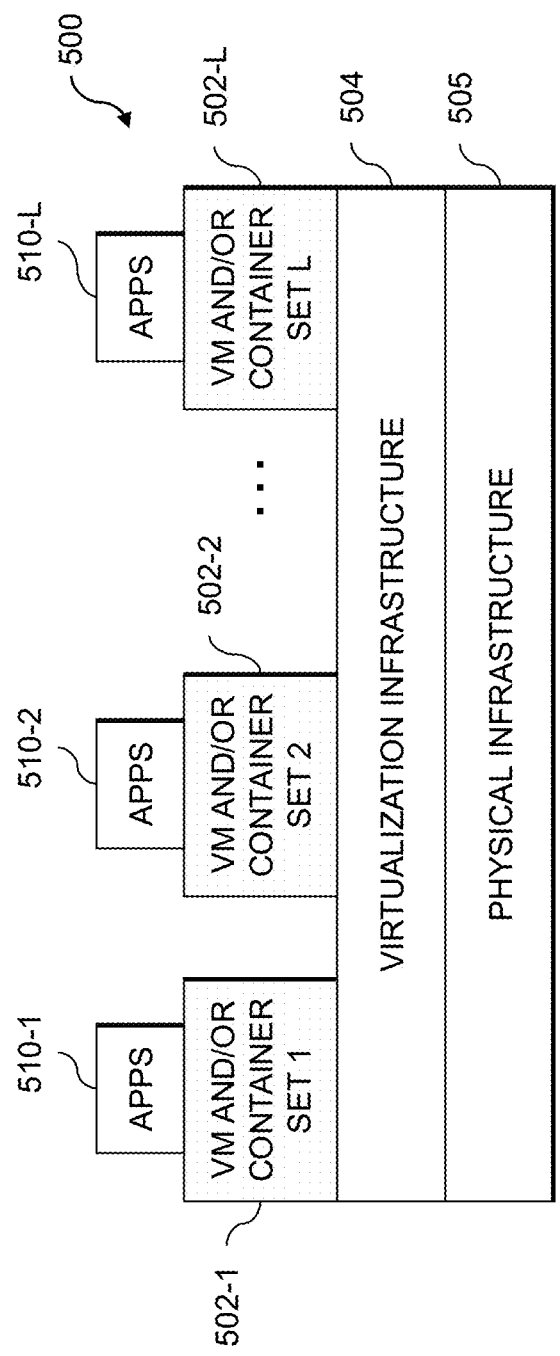
FIGS. 5 and 6 show examples of processing platforms that may be utilized to implement at least a portion of an information processing system in illustrative embodiments.
Figure 6:
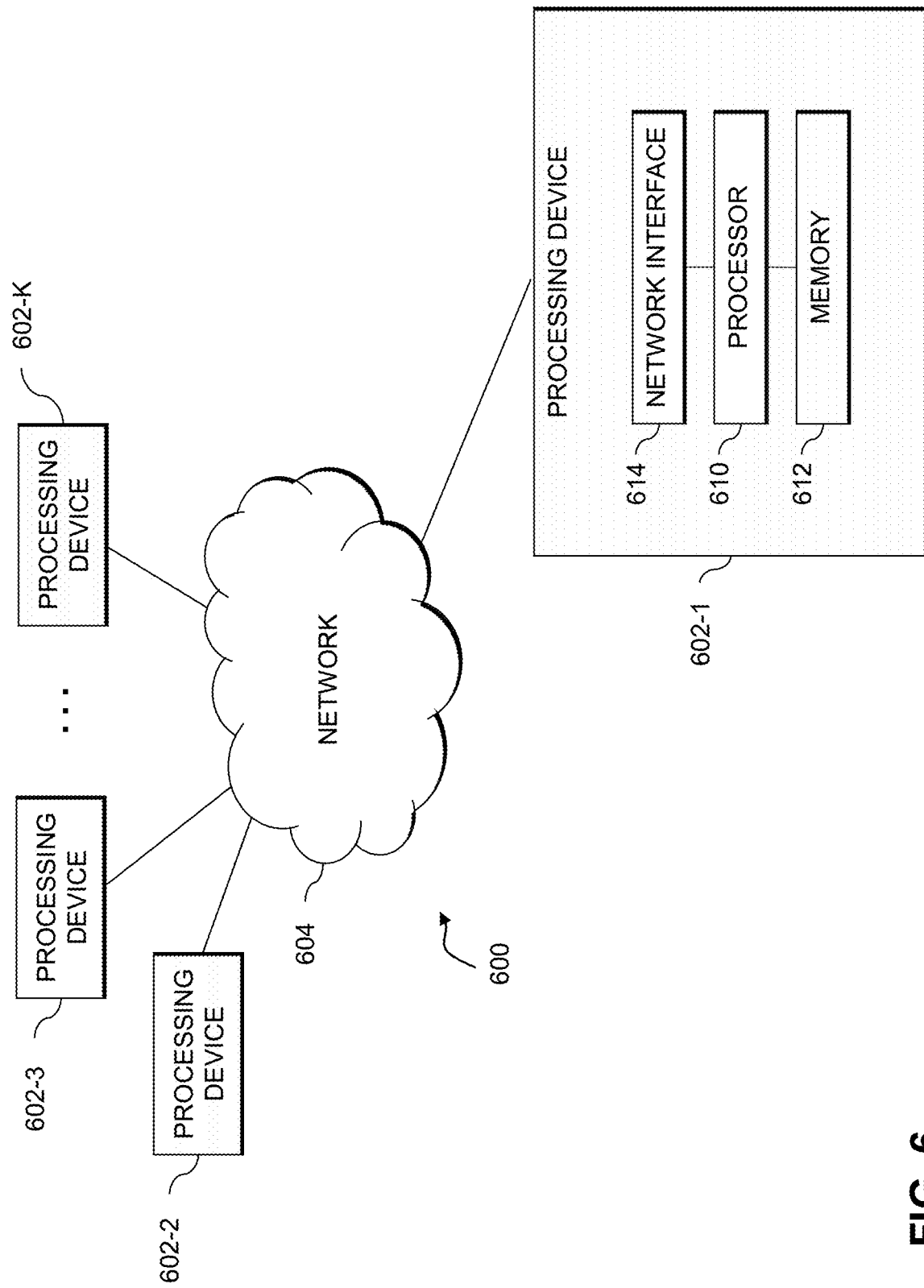

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
identifying a context of a data movement operation based at least in part on a source and an indicated destination of data associated with the data movement operation;
applying one or more data protection policies to the data movement operation based at least in part on the identified context, wherein a given data protection policy comprises one or more indications of one or more content scanners that are configured to detect data belonging to one or more regulated data classes;
selecting and executing at least a portion of the one or more content scanners based at least in part on a scrutiny level computed for the data movement operation; and
in response to detecting data associated with the data movement operation that belongs to at least one of the regulated data classes, performing one or more automated remedial actions associated with the at least one regulated data class;
wherein the method is performed by at least one processing device comprising a processor coupled to a memory.

2. The computer-implemented method of claim 1, wherein identifying the context comprises determining one or more of the following attributes for at least one of the source and the indicated destination:
a physical location;
a virtual location;
a system name; and
a vendor.

3. The computer-implemented method of claim 1, wherein identifying the context is further based on one or more characteristics of a process triggering the data movement operation.

4. The computer-implemented method of claim 3, wherein the one or more characteristics comprise at least one of a user identifier and one or more group identifiers.

5. The computer-implemented method of claim 3, wherein the scrutiny level is computed based on the one or more characteristics of said process.

6. The computer-implemented method of claim 1, wherein:
the one or more content scanners are further configured to generate metadata in response to detecting that the data associated with the data movement operation belongs to at least one of the regulated data classes, and
the one or more automated remedial actions are performed based at least in part on the metadata.

7. The computer-implemented method of claim 6, wherein the metadata comprises a location of the detected data.

8. The computer-implemented method of claim 1, wherein the one or more automated remedial actions comprise one or more of:
redirecting at least a portion of the detected data to a different destination;
redacting at least a portion of the detected data;
preventing the data movement operation;
blocking one or more additional data movement operations one or more of from the source and to the indicated destination; and
generating one or more alerts.

9. The computer-implemented method of claim 1, wherein the context of the data movement operation comprises a set of attributes corresponding to at least the source, the indicated destination, and a process triggering the data movement operation, and wherein the one or more automated remedial actions comprise:
providing feedback information to change a context of one or more subsequent data movement operations having at least one shared attribute with the set of attributes corresponding to the data movement operation.

10. A non-transitory processor-readable storage medium having stored therein program code of one or more software programs, wherein the program code when executed by at least one processing device causes the at least one processing device:
to identify a context of a data movement operation based at least in part on a source and an indicated destination of data associated with the data movement operation;
to apply one or more data protection policies to the data movement operation based at least in part on the identified context, wherein a given data protection policy comprises one or more indications of one or more content scanners that are configured to detect data belonging to one or more regulated data classes;
to select and execute at least a portion of the one or more content scanners based at least in part on a scrutiny level computed for the data movement operation; and
in response to detection of data associated with the data movement operation that belongs to at least one of the regulated data classes, to perform one or more automated remedial actions associated with the at least one regulated data class.

11. The non-transitory processor-readable storage medium of claim 10, wherein identifying the context is further based on one or more characteristics of a process triggering the data movement operation.

12. The non-transitory processor-readable storage medium of claim 11, wherein the scrutiny level is computed based on the one or more characteristics of said process.

13. The non-transitory processor-readable storage medium of claim 10, wherein:
the one or more content scanners are further configured to generate metadata in response to detecting that the data associated with the data movement operation belongs to at least one of the regulated data classes, and
the one or more automated remedial actions are performed based at least in part on the metadata.

14. The non-transitory processor-readable storage medium of claim 13, wherein the metadata comprises a location of the detected data.

15. The non-transitory processor-readable storage medium of claim 10, wherein the one or more automated remedial actions comprise one or more of:
- redirecting at least a portion of the detected data to a different destination;
- redacting at least a portion of the detected data;
- preventing the data movement operation;
- blocking one or more additional data movement operations one or more of from the source and to the indicated destination; and
- generating one or more alerts.

16. The non-transitory processor-readable storage medium of claim 10, wherein the context of the data movement operation comprises a set of attributes corresponding to at least the source, the indicated destination, and a process triggering the data movement operation, and wherein the one or more automated remedial actions comprise:
- providing feedback information to change a context of one or more subsequent data movement operations having at least one shared attribute with the set of attributes corresponding to the data movement operation.

17. An apparatus comprising:
- at least one processing device comprising a processor coupled to a memory;
- the at least one processing device being configured:
- to identify a context of a data movement operation based at least in part on a source and an indicated destination of data associated with the data movement operation;
- apply one or more data protection policies to the data movement operation based at least in part on the identified context, wherein a given data protection policy comprises one or more indications of one or more content scanners that are configured to detect data belonging to one or more regulated data classes;
- to select and execute at least a portion of the one or more content scanners based at least in part on a scrutiny level computed for the data movement operation; and
- in response to detection of data associated with the data movement operation belonging to at least one of the regulated data classes, to perform one or more automated remedial actions associated with the at least one regulated data class.

18. The apparatus of claim 17, wherein identifying the context is further based on one or more characteristics of a process triggering the data movement operation.

19. The apparatus of claim 18, wherein the scrutiny level is computed based on the one or more characteristics of said process.

20. The apparatus of claim 18, wherein:
- the one or more content scanners are further configured to generate metadata in response to detecting that the data associated with the data movement operation belongs to at least one of the regulated data classes, and
- the one or more automated remedial actions are performed based at least in part on the metadata.

* * * * *